United States Patent
Schoor et al.

(10) Patent No.: US 10,416,299 B2
(45) Date of Patent: Sep. 17, 2019

(54) MIMO RADAR MEASUREMENT SENSOR

(71) Applicant: Robert Bosch GmbH, Stuttgart (DE)

(72) Inventors: Michael Schoor, Stuttgart (DE); Benedikt Loesch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 15/318,727

(22) PCT Filed: Apr. 23, 2015

(86) PCT No.: PCT/EP2015/058771
§ 371 (c)(1),
(2) Date: Dec. 14, 2016

(87) PCT Pub. No.: WO2015/197226
PCT Pub. Date: Dec. 30, 2015

(65) Prior Publication Data
US 2017/0131392 A1    May 11, 2017

(30) Foreign Application Priority Data

Jun. 26, 2014  (DE) .......... 10 2014 212 284

(51) Int. Cl.
*G01S 13/02*    (2006.01)
*G01S 7/35*    (2006.01)
(Continued)

(52) U.S. Cl.
CPC .......... *G01S 13/0209* (2013.01); *G01S 7/354* (2013.01); *G01S 13/34* (2013.01); *G01S 13/343* (2013.01);
(Continued)

(58) Field of Classification Search
CPC .......... G01S 13/343; G01S 13/931; G01S 2007/356; G01S 7/354; G01S 13/584;
(Continued)

(56) References Cited

U.S. PATENT DOCUMENTS 6,924,762 B2 * 8/2005 Miyake .......... G01S 13/34
342/109
7,339,518 B2 * 3/2008 Natsume .......... G01S 7/36
342/109
(Continued)

FOREIGN PATENT DOCUMENTS

CN    103576139 A    2/2014
DE    102012008350 A1    10/2013
(Continued)

OTHER PUBLICATIONS

International Search Report dated Jul. 28, 2015, of the corresponding International Application PCT/EP2015/058771 filed Apr. 23, 2015.

*Primary Examiner* — Olumide Ajibade Akonai
(74) *Attorney, Agent, or Firm* — Norton Rose Fulbright US LLP; Gerard Messina

(57) ABSTRACT

A MIMO FMCW radar sensor and a MIMO time multiplexing method for localizing a radar target, in which an FMCW radar measurement is performed with a transmitted signal whose modulation pattern encompasses, for different transmission switching states that differ in terms of the selection of antenna elements used for transmission, mutually temporally interleaved sequences of ramps; ambiguous values for the relative velocity of the radar target are determined from a position of a peak in a two-dimensional spectrum; phase relationships between spectral values of spectra are checked for agreement with phase relationships expected for several of the determined values of the relative velocity; on the basis thereof, an estimated value for the relative velocity of the radar target is selected from the determined periodic values of the relative velocity; and the angle of the radar target is determined on the basis of amplitudes and/or phase relationships between obtained baseband signals.

11 Claims, 4 Drawing Sheets

(51) Int. Cl.
- *G01S 13/34* (2006.01)
- *G01S 13/42* (2006.01)
- *G01S 13/58* (2006.01)
- *G01S 13/536* (2006.01)
- *G01S 13/93* (2006.01)

(52) U.S. Cl.
CPC .......... *G01S 13/42* (2013.01); *G01S 13/584* (2013.01); *G01S 13/536* (2013.01); *G01S 13/931* (2013.01); *G01S 2007/356* (2013.01); *G01S 2013/0245* (2013.01)

(58) Field of Classification Search
CPC ...... G01S 13/0209; G01S 13/34; G01S 13/42; G01S 13/345; G01S 7/285; G01S 13/003; G01S 13/282; G01S 13/582; G01S 13/536; G01S 13/32
See application file for complete search history.

(56) References Cited

U.S. PATENT DOCUMENTS

| | | | |
|---|---|---|---|
| 9,024,809 B2* | 5/2015 | Testar | G01S 7/35 |
| | | | 342/109 |
| 9,354,304 B2* | 5/2016 | Kirsch | G01S 13/58 |
| 9,971,028 B2* | 5/2018 | Park | G01S 13/584 |
| 2003/0052813 A1* | 3/2003 | Natsume | G01S 7/354 |
| | | | 342/70 |
| 2005/0156780 A1* | 7/2005 | Bonthron | G01S 3/48 |
| | | | 342/107 |
| 2005/0285773 A1 | 12/2005 | Hartzstein et al. | |
| 2008/0042895 A1* | 2/2008 | Inaba | G01S 13/34 |
| | | | 342/112 |
| 2012/0001791 A1* | 1/2012 | Wintermantel | G01S 7/023 |
| | | | 342/109 |
| 2015/0378016 A1* | 12/2015 | Schoor | G01S 13/345 |
| | | | 342/21 |

FOREIGN PATENT DOCUMENTS

| | | |
|---|---|---|
| EP | 0730166 A1 | 9/1996 |
| EP | 2060929 A1 | 5/2009 |
| JP | 2009288223 A | 12/2009 |
| JP | 2011526370 A | 10/2011 |
| JP | 2011526371 A | 10/2011 |
| WO | 2010115418 A2 | 10/2010 |
| WO | 2015190565 A1 | 12/2015 |

* cited by examiner

MIMO RADAR MEASUREMENT SENSOR

FIELD

The present invention relates to a method for localizing a radar target with an angularly resolving MIMO FMCW radar sensor, in which received signals are mixed down with the transmitted signal to baseband signals, and the angle of a localized radar target is determined on the basis of amplitudes and/or phase relationships between baseband signals which are obtained for different selections of antenna elements of the radar sensor which are used for transmission and for reception.

The present invention further relates to a radar sensor, in particular for motor vehicles, that is configured to carry out this method.

BACKGROUND INFORMATION

In motor vehicles, FMCW radar sensors are used to detect the traffic environment, in particular to localize other vehicles. The localization results can be used for a variety of assistance functions, for example for automatic separation control, automatic collision warning, or also automatic triggering of an emergency braking procedure in the case of an acute risk of collision.

In frequency modulated continuous wave (FMCW) radar sensors, a transmitted signal having a frequency modulated in ramp-shaped fashion is used. The signal is transmitted continuously during the course of the ramp. A baseband signal is generated from a received signal by mixing with the transmitted signal, and is sampled and evaluated.

The frequency of the baseband signal corresponds to the frequency difference between the signal transmitted at a given point in time and the signal received at the same point in time. Because of the frequency modulation of the transmitted signal, this frequency difference depends on the transit time of the signal from the radar sensor to the object and back, and thus on the distance of the object. Because of the Doppler effect, however, the frequency difference also contains a component that is conditioned by the relative velocity of the object. A measurement of the frequency difference on a single ramp therefore does not yet permit a determination of the distance and the relative velocity, but instead supplies only a linear relationship between those variables. This relationship can be depicted as a straight line on a distance-velocity diagram (d-v diagram).

There are conventional FMCW radar sensors that work with a sequence of identical, comparatively short ramps, called "rapid chirps," which have a large frequency swing in relation to their duration and are therefore so steep that the distance-dependent component of the frequency shift dominates in the baseband signal while the Doppler shift is sampled by the sequence of ramps. A sufficiently high repetition rate of the short ramps is therefore necessary in order to arrive at an unambiguous determination of the relative velocity within a measurement region of the relative velocity. In particular, the time offset between successive short ramps must be less than half the period length of the Doppler frequency.

The radar sensor usually has several antenna elements that are disposed with a spacing from one another on a line, for example a horizontal line, so that different azimuth angles of the localized objects result in differences in the path lengths traveled by the radar signals from the object to the respective antenna element. These path length differences result in corresponding differences in the phase of the signals that are received by the antenna elements and evaluated in the associated evaluation channels. The angle of incidence of the radar signal, and thus the azimuth angle of the localized object, can then be determined by equalizing the (complex) amplitudes received in the various channels with corresponding amplitudes in an antenna diagram.

In a multiple input/multiple output (MIMO) radar, a greater angular resolution capability is achieved by the fact that not only several receiving antenna elements but also several transmitting antenna elements are worked with, different combinations of transmitting and receiving antenna elements being evaluated and resulting in respective differences in the path length of a reflected signal.

In a MIMO radar, the signals transmitted with different selections of the transmitting antenna elements must be orthogonal to one another or separable in time. This can be achieved, for example, by code multiplexing, frequency multiplexing, or time multiplexing. The code multiplexing method requires a great deal of outlay, however, and enables only limited signal orthogonality. With the frequency multiplexing method the disadvantage exists that the phase and the Doppler shift are dependent on the respective wavelength. The method proposed here is therefore based on the time multiplexing principle. The problem exists in that context, however, that relative motions of the localized objects, in conjunction with the time difference between the measurements with different switching states, result in phase differences that complicate subsequent angle estimation.

BACKGROUND INFORMATION

An object of the present invention is to provide a time-multiplexing method for a MIMO radar which permits a more accurate angle estimate.

This object is achieved according to the present invention by a method of the kind recited initially in which:

(a) the transmitted signal is frequency-modulated in ramp-shaped fashion and exhibits a modulation pattern that encompasses several sequences of ramps which follow one another within the respective sequence in time-offset fashion at a time interval,
  at least two of the sequences being associated with different transmission switching states that differ in terms of the selection of antenna elements used for transmission, and being temporally interleaved with one another,
  a switchover occurring, between successive ramps that are associated with different transmission switching states, between the relevant transmission switching states,
  at least one of the transmission switching states respectively having associated with it at least two of the sequences that are temporally interleaved with one another and exhibit with respect to one another, with reference to a first sequence, a time offset associated with a respective further sequence;

(b) from the baseband signals, at least for the at least one transmission switching state with which several sequences are associated, a two-dimensional spectrum is calculated separately for each of those sequences by two-dimensional Fourier transformation, transformation occurring in the first dimension ramp for ramp and transformation occurring in the second dimension over a ramp index that counts the ramps within the sequence;

(c) based on a position of a peak in at least one two-dimensional spectrum of the baseband signals, values for the relative velocity of a radar target which are periodic with a predetermined velocity period are determined, (d) phase relationships of spectral values that are obtained respectively at the same position and respectively for the same transmission switching state in the separately calculated two-dimensional spectra are checked for agreement with phase relationships expected for several of the periodic values of the relative velocity in the context of the respective transmission switching state; and (e) based on the result of the check, an estimated value for the relative velocity of the radar target is selected from the determined periodic values of the relative velocity.

The sequences are temporally interleaved with one another. In other words, the ramps of one sequence have ramps of the respective other sequence(s) disposed in gaps between them. The term "interleaved with one another" is used here synonymously with the terms "intermeshed with one another" or "interwoven with one another."

An undersampling of the Doppler shift frequency occurs over the sequence of ramps, so that the information obtained regarding the relative velocity is affected by an ambiguity. In particular, the value of the relative velocity is periodic with a velocity interval $$\Delta v = \frac{c}{2f_0 T_{r2r}} \quad (1)$$

where c is the speed of light, $f_0$ the average transmission frequency, and Tr2r the time interval between the ramps within a sequence. An ambiguity-affected value of the relative velocity of the radar target is therefore determined from a position of a peak, associated with the radar target, in a two-dimensional spectrum of the sampled baseband signals. The ambiguity can then be resolved by investigating how well those phase relationships between the signals of the sequences associated with the same transmission switch state which are expected for the respective values of the relative velocity agree with the measured phase relationship. The expected phase relationship depends respectively on the relative velocity and on the time offset between the relevant sequences.

This allows an unambiguous estimate of the relative velocity within a velocity measuring range that can be, for example, at least a multiple of the unambiguity range of a measurement with only one of the sequences of ramps. It is advantageous in particular that relatively long time intervals are possible between the ramps, i.e., between the ramp center points, of a sequence, so that the hardware outlay is decreased or a more accurate localization is enabled for the same hardware outlay.

The particular advantage resulting from the temporal interleaving of the sequences which is thereby simplified is that the baseband signals or spectra thereof that are used for angle determination, which are obtained with different transmission switching states, are measured almost simultaneously, so that phase shifts resulting from relative motions can be minimized and/or can be corrected particularly accurately.

An improved angle estimate can thus be enabled despite decreased hardware costs due to shorter time intervals.

The ramps are preferably disposed at irregular spacings within a period of the modulation pattern whose length corresponds to the time interval Tr2r, so that the modulation pattern exhibits as little symmetry as possible despite the regular time interval Tr2r. Because of the uniform time interval Tr2r, the time offsets between the ramps of different sequences repeat from one period to another.

Preferably, in step (e) of selecting an estimated value for the relative velocity of the radar target, the estimated value for the relative velocity is unambiguously determined in a measurement range for the relative velocity, an upper maximum value $v_{max}$ of the measurement range being related as follows to the temporal spacing Tr2r of the ramp center points within a sequence:

$$Tr2r > c/(4f_0 v_{max})$$

where c is the speed of light and $f_0$ the average transmission frequency. This corresponds to an undersampling of a maximum relative velocity $v_{max}$ of a radar target which is to be detected, by way of the respective sequence of ramps having the temporal spacing Tr2r between successive ramps. Preferably Tr2r is equal to at least a multiple of the aforesaid variable on the right side of the equation.

Preferably, in step (e) of selecting an estimated value for the relative velocity of the radar target, the estimated value for the relative velocity is unambiguously determined in a measurement range for the relative velocity, an upper maximum value $v_{max}$ of the measurement range being related as follows to the respective time offset T12 of the respective further sequence:

$$T12 > c/(4f_0 v_{max})$$

Preferably T12 is equal to at least a multiple of the aforesaid variable on the right side of the equation. The hardware outlay for carrying out the method can be reduced by selecting such a relatively large time offset T12 between the sequences of the ramps, since the resulting ambiguity of the measured phase relationship can be permitted. This is because an unambiguous estimated value for the relative velocity can nevertheless be determined within the larger measurement region.

Advantageous embodiments of the present invention are described herein.

In an angularly resolving measurement, antenna elements are disposed in various positions in a direction in which the radar sensor is angularly resolving. For example, several antenna elements are used for reception. For an ideal, approximately point-like radar target in a respective angular position, a characteristic phase relationship and amplitude relationship exists between the signals received in different antenna elements. The amplitude ratios between the received signals depend on the directional angle and on the sensitivity curves of the antenna elements. It is possible to determine the angular position of a localized radar object by evaluating the phase relationships and/or by evaluating the amplitude relationships.

For a standard object at a given distance and having a given reflection intensity, the dependence of the amplitude and phase of the signal, transmitted from one antenna element and received after reflection at the radar target at one antenna element, on the angular position of the localized radar target can be depicted in an antenna diagram. The angular position of a radar target can be determined, for example, by equalizing the amplitudes and/or phases obtained for different selections of antenna elements used for transmission and reception, with the corresponding antenna diagrams.

Preferably, successive ramps within a respective sequence have an identical ramp slope and an identical difference between their ramp center frequencies as well as, particularly preferably, an identical frequency swing, the aforesaid difference in the ramp center frequencies optionally being not equal to zero, and ramps that have the same ramp index in the respective sequences exhibiting the same ramp slope and the same ramp center frequency as well as, particularly preferably, an identical frequency swing. The phase relationships resulting from the relative velocity of a radar target can be measured particularly accurately, and angle determination is simplified, if the frequency profile of all ramps of all sequences is identical, except for the frequency difference from ramp to ramp which is optionally selected to be not equal to zero.

The available measurement time can be utilized particularly effectively if the time offset between the sequences and the temporal spacing of the ramps within a sequence are of the same order of magnitude. Influences of an object acceleration on the phase relationship between the baseband signals of the individual sequences can furthermore thereby be minimized. Favorable values for the time offset between the sequences and the temporal spacing of the ramps within a sequence, which values are as "incommensurable" as possible (i.e., for example are not multiples of one another), can furthermore thereby be selected. Resolution of the ambiguity then results in a particularly large measurement range for the relative velocity. The modulation pattern accordingly contains pauses between the ramps. In particular, the modulation pattern preferably exhibits at least one pause that recurs regularly between each two successive ramps of a sequence, with a time interval from one pause to another which is equal to the time interval between the ramps of a sequence.

Preferably, ramps of the respective sequences are disposed alternately during a predominant time span of the modulation pattern, i.e., the sequences largely overlap in time. Preferably the time offset, associated with a respective further sequence, between the ramps of the further sequence and the relevant ramps of the first sequence is less than twice the time interval between the ramps within a respective sequence, particularly preferably is less than that time interval. The latter is equivalent to saying that one respective ramp of a respective further sequence of ramps that are associated with the same transmission switching state is always transmitted between two successive ramps of a first sequence.

Preferably, the separately calculated two-dimensional spectra are merged into one two-dimensional spectrum of the baseband signals, in particular into a power spectrum, that is used in step (c) of determining values for the relative velocity. The merger is, for example, non-phase-coherent, preferably a non-phase-coherent summation of the squares of the absolute values of the spectral values to yield a power spectrum. The detection of a peak can thereby be improved. In particular, the decrease in the signal to noise ratio of the separately calculated spectra, brought about by the distribution of the available measurement time into several sequences of ramps and by the pauses, can thereby be largely compensated for.

Preferably a relationship in accordance with the equation $$\Delta\varphi_{12,m} = 2\pi \frac{2}{c} f_0 T_{12,m} v \qquad (2)$$

is used in the context of checking the phase relationship, which equation correlates a phase difference $\Delta\varphi_{12,m}$ expected between a phase of the spectral value of the respective spectrum of a further sequence and a phase of the spectral value of the spectrum of the first sequence of the same transmission switching state m, with the time offset T12 associated with the further sequence and with the relative velocity v, where c is the speed of light and $f_0$ the average transmission frequency. Instead of T12 and $\Delta\varphi_{12,m}$ for the second sequence it is possible to write generally T1i,m or $\Delta\varphi_{1i,m}$ for the i-th sequence, where i>1, of the sequences associated with the transmission switching state m.

A control vector a(v,m), dependent on the relative velocity v and optionally dependent on the transmission switching state m, according to the equation $$a(v, m) = \frac{1}{\sqrt{l}} \begin{vmatrix} 1 \\ M \\ e^{2\pi j \frac{2}{c} f_0 T_{1i,m} v} \end{vmatrix}, \qquad (3)$$

is preferably used in the context of checking the phase relationship, where m designates the respective transmission switching state, l is the number of sequences, i=1, . . . , l counts the sequences, and in the i-th component of the vector T1i,m (for i>1) is the time offset, associated with the i-th sequence, with respect to the first sequence, for the sequences associated with the m-th transmission switching state. The time offset between sequences always refers to sequences that are associated with the same transmission switching state. In this notation the control vector a(v) is a column vector whose components respectively describe the expected phase difference of the i-th sequence with respect to the partial measurement of the first sequence, the expected phase difference being respectively determined as a phase of a complex exponential function. The number of components of the vector is l. The common pre-factor is a normalization factor and is equal to 1 divided by the square root of the number 1 of sequences used. In the exponent of the exponential function, j designates the imaginary unit unless otherwise indicated.

Preferably, different time offsets T1i,m of respective further sequences with respect to the respective first sequence are used in the context of different transmission switching states m. In other words, each time offset T1h,m used for a further transmission switching state having several associated sequences, where m>1 and h=1, . . . , H, differs from each time offset T1i,1 (where i=1, . . . , 1) used for a first transmission switching state, where H is the number of sequences of the further transmission switching state which are used, and optionally differs from 1. The control vector a(v,m) thus depends on the respective time offset and thus on the respective transmission switching state.

Preferably a first and a second of the transmission switching states each have associated with them at least two of the sequences which are temporally interleaved with one another and exhibit with respect to one another, with reference to a first sequence of the respective transmission switching state, a time offset associated with a respective further sequence of the transmission switching state, different time offsets of the further sequences being used in the context of the different transmission switching states.

Preferably the baseband signals used for determining the angle are subjected to a phase correction that compensates for the phase shifts expected for the estimated value of the relative velocity.

Preferably, in the context of ramps each having the same ramp index in respective sequences in the modulation pattern, the sequential order of the transmission switching states with which the ramps are respectively associated is mixed. In other words, the sequential order deviates from the generic sequential order in which the transmission switching states occur successively with their respective associated ramps. Effects on the angle determination of an error in estimating the relative velocity can thereby be decreased. In particular, between two ramps of a sequence of the first or second transmission switching state having the same ramp index, preferably at least one ramp of a sequence of the respective other transmission switching state having the same ramp index is always transmitted.

A knowledge of the control vector a(v,m) makes it possible to create an (under suitable conditions, unambiguous) relationship between the relative velocity v of the radar target and the received complex spectral values at the position of the peak, and to infer, from the phase relationships of the received signals, the relative velocity v of the radar target. But because in practice the received signals are more or less affected by noise, the velocity cannot be exactly calculated but can only be estimated, for example with the aid of a maximum likelihood estimate.

A measurement vector is defined, for example for one reception channel n, as $$a_{k,l}(n, m) = \begin{bmatrix} x_1(n, m) \\ M \\ x_I(n, m) \end{bmatrix}, \quad (4)$$

where i=1, . . . , l, in the i-th component of the vector $x_i(n,m)$ designates a complex spectral value at a position k,l of the two-dimensional spectrum of the of the sampled baseband signals of the i-th sequence of ramps of the reception channel n and of the transmission switching state m. For example, n counts the reception channels such that n=1, . . . , N for N reception channels, and m counts the transmission switching states such that m=1, . . . , M for M transmission switching states.

BRIEF DESCRIPTION OF THE DRAWINGS

Exemplifying embodiments will be explained in further detail below with reference to the figures.

DETAILED DESCRIPTION OF EXAMPLE EMBODIMENTS

Figure 1:
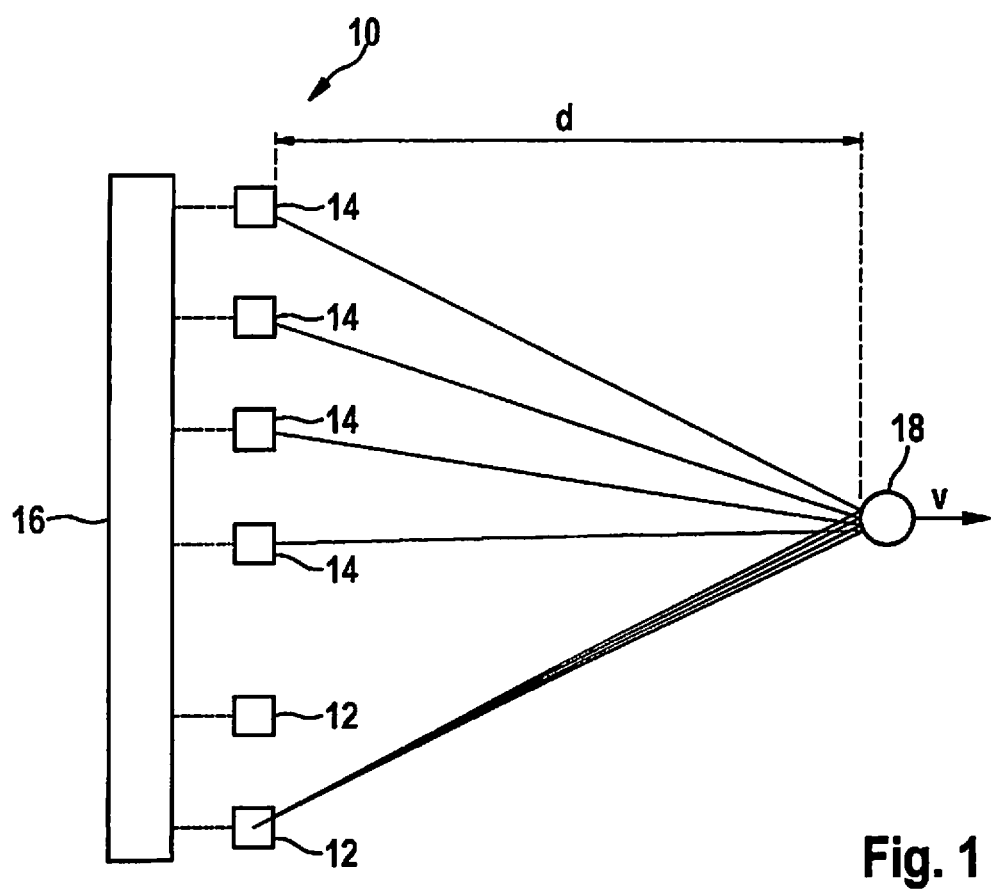
FIG. 1 is a diagram of a MIMO FMCW radar sensor having two transmitting antenna elements and four receiving antenna elements.

FIG. 1 is a diagram of a very simple example of a (MIMO) FMCW radar sensor 10 that in this example has only two transmitting antenna elements 12 and four receiving antenna elements 14. Larger numbers of antenna elements are possible in practice. Transmitting antenna elements 12 are powered by a control and evaluation unit 16 and emit radar signals that are reflected at an object 18 and received by each of the receiving antenna elements 14. Transmitting antenna elements 12 and receiving antenna elements 14 are each of similar construction and therefore have matching fields of view. The transmitting and receiving antenna elements can each be made up of a patch antenna array.

The received signals are mixed down to baseband signals and evaluated in control and evaluation unit 16. Radar sensor 10 is installed, for example, at the front in a motor vehicle and serves to measure distances d, angles, and relative velocities v of objects 18, for example of preceding vehicles. The frequency of the transmitted signal is modulated within one radar measurement with sequences of rising or falling ramps.

A bistatic antenna system, in which transmitting antenna elements 12 are different from receiving antenna elements 14, has been depicted here simply in the interest of clarity. A monostatic antenna concept, in which the same antenna elements are used in each case for transmission and reception, can also be used in practice.

Antenna elements 12, 14 are disposed in different positions in a direction in which radar sensor 10 is angularly resolving. In this example, receiving antenna elements 14 are disposed at regular spacings on a straight line (uniform linear array; ULA). The same also applies to transmitting antenna elements 12; the transmitting and receiving antenna elements do not necessarily need to be disposed on the same straight line. If the radar sensor is to be used to measure azimuth angles of the objects, the straight lines on which the antenna elements are disposed extend horizontally. In the case of a sensor for measuring elevation angles, conversely, the antenna elements would be disposed on vertical straight lines. Also possible is a two-dimensional antenna array with which both azimuth angles and elevation angles can be measured.

In the example shown, radar sensor 10 is operated using the time-multiplexed method. At each point in time at most one of the M=2 transmitting antenna elements 12 is active and is transmitting the transmitted signal. The activity phases of the individual antenna elements 12 alternate cyclically with one another. FIG. 1 illustrates the situation in which only the bottom one of the two transmitting antenna elements 12 is active.

Figure 2:
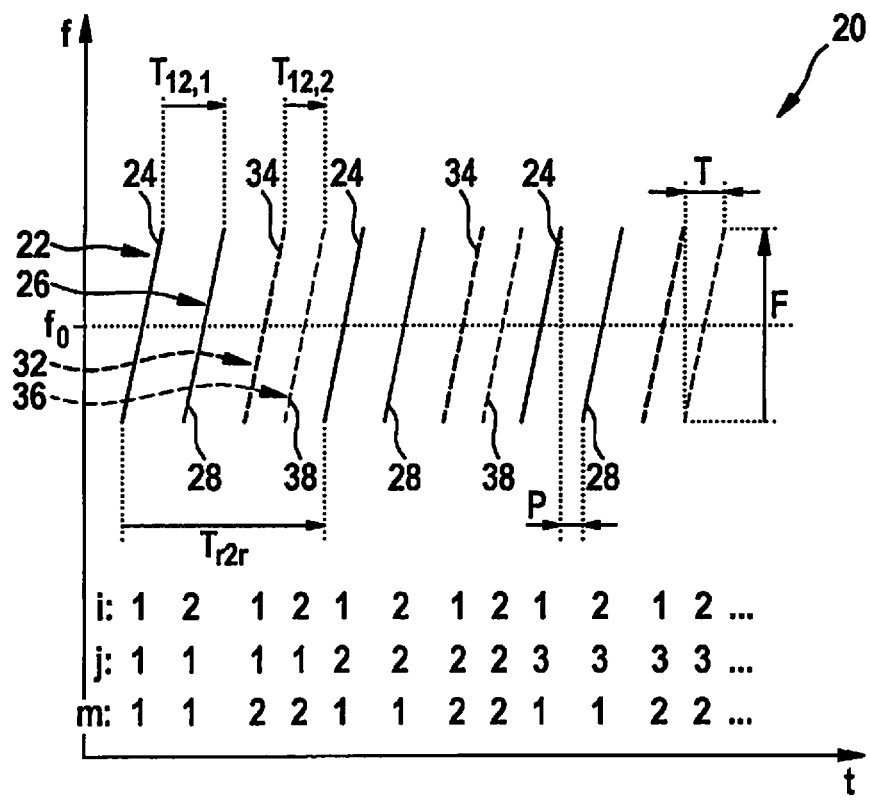
FIG. 2 shows a modulation pattern having four sequences of similar ramps which are transmitted in time-offset fashion.

FIG. 2 shows the transmission frequency f of the transmitted signal 20 plotted against time t. In the context of a measurement, two sequences of ramps having identical ramp parameters, which are temporally interleaved with one another, are transmitted with each transmitting antenna element 12. A first sequence 22 of ramps 24 and a second sequence 26 of ramps 28 that are associated with a first transmitting antenna element 12 are depicted in FIG. 2 respectively with thick and thin solid lines. A first sequence 32 of ramps 34 and a second sequence 36 of ramps 38 that are associated with a second transmitting antenna element 12 are depicted in FIG. 2 respectively with thick and thin dashed lines. The number i of the sequence to which a ramp belongs, the respective ramp index j of the ramp within a sequence, and the number m of the respective antenna element 12, are indicated.

Associated with each transmitting antenna element m, m=1, . . . , M, is a time offset T12,m by which ramps 28, 38 of the respective second sequence 26, 36 are shifted with respect to ramps 24, 34 of the respective first sequence 22, 32 having the same ramp index j. The time offsets T12,1 and T12,2 are preferably of different sizes.

Within each sequence, the successive ramps are shifted with respect to one another by a temporal spacing Tr2r. The temporal spacing Tr2r is the same for all sequences of all transmitting antenna elements 12. In addition, at least one common pause P is present between each two successive ramps of a sequence.

In the example depicted in FIG. 2, the difference in ramp center frequency between successive ramps within a sequence is equal to zero. All the ramps therefore have the same frequency profile. The ramp center frequency corresponds here to the average transmission frequency $f_0$.

Figure 4:
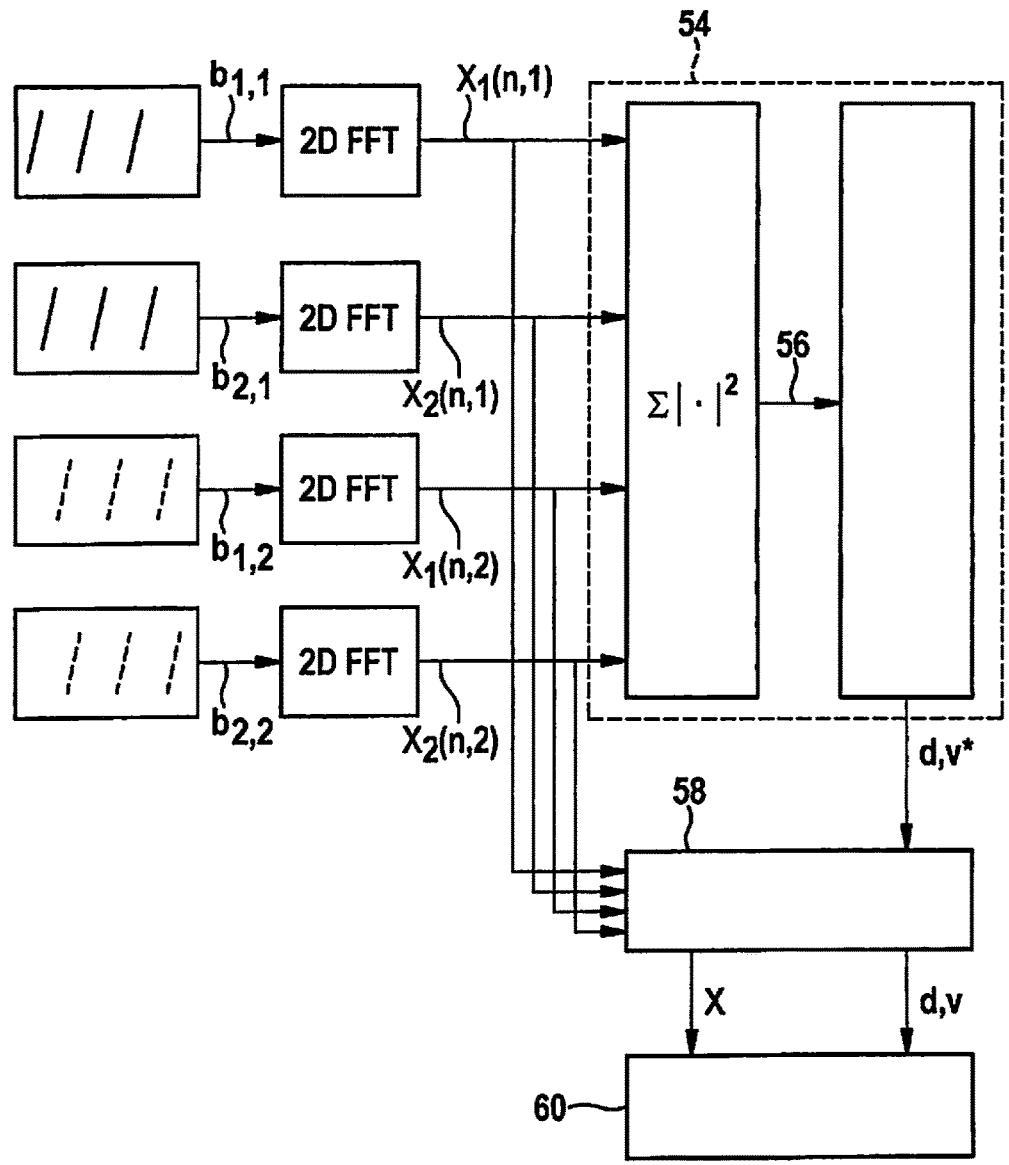
FIG. 4 is a more detailed block diagram of an evaluation device of a MIMO FMCW radar sensor.

FIG. 4 schematically shows a more detailed block diagram of the operations carried out by control and evaluation unit 16 in order to determine the relative velocity v, distance d, and object angle. To simplify the depiction, processing is depicted for only one reception channel n.

For each sequence i of one transmitting antenna element m, the received, sampled baseband signals bi,m are each subjected to a two-dimensional Fourier transformation (2D-FFT). The first dimension corresponds to a transformation of the baseband signals obtained for the individual ramps. The second dimension corresponds to a transformation over the sequence of ramps, i.e. over the ramp index j. A two-dimensional spectrum $X_i(n,m)$ is therefore obtained for each sequence i of a transmitting antenna element m. The magnitudes of the respective transformations, i.e. the respective numbers of bins (sampling points or interpolation points), are preferably uniform for the first dimension for all spectra and uniform for the second dimension for all spectra.

Because of the relative velocity v of radar target 18 and the time offset T12,m between the partial measurements with a transmitting antenna element m corresponding to individual sequences of ramps, a phase difference occurs between the two partial measurements. The phase difference $\Delta\phi_{12,m}$ is described by way of example in equation (2). It is obtained as a phase difference between the complex amplitudes (spectral values) of a peak $X_1(n,m)$ (k,l), $X_2(n,m)$ (k,l) occurring at the same position (k,l) in both two-dimensional spectra. Because of the relatively large time offset T12,m between the mutually corresponding ramps of the two respective sequences, however, a determination of the phase difference between the two partial measurements with the same transmitting antenna element m does not allow a direct inference as to the relative velocity v. The reason is that, because of the periodicity of the phases, a single phase difference results in an ambiguity for the associated value of the relative velocity v.

The two-dimensional spectra $X_i(n,m)$ that are obtained are delivered to a first functional block 54 that calculates a respective power spectrum from the complex spectra by squaring the absolute value of the respective spectral values; and the power spectra are merged in point fashion, by summing or averaging, to yield an integrated two-dimensional power spectrum 56.

The position in the power spectrum 56 of a peak which corresponds to a radar target 18, which position is indicated here as bin k,l, corresponds to the position of the peak in the individual spectra $X_i(n,m)$. From the first dimension, corresponding to bin k of the position of the peak, a linear correlation between the relative velocity v and the distance d of the radar target is obtained in accordance with the FMCW equation $k=2/c(dF+f_0vT)$, where c is the speed of light, F the ramp swing, T the ramp duration of an individual ramp, and $f_0$ the average transmission frequency. If the frequency difference of successive ramps of a sequence is equal to zero, the peak position in the second dimension l contains only information regarding the relative velocity v of the radar target.

Figure 3:
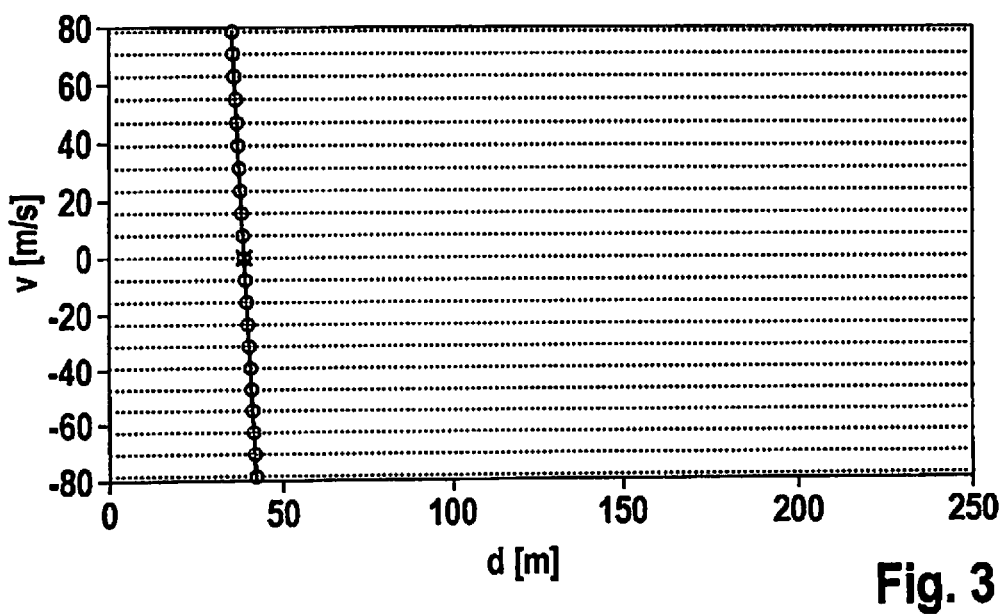
FIG. 3 is a velocity/distance diagram having values, periodic at a predetermined interval, of the relative velocity of a radar target.

FIG. 3 is a schematic diagram in which the relative velocity v is plotted against distance d. The linear relationship between v and d is plotted as a straight line. In the example, the information with regard to the relative velocity of the radar target obtained from sampling of the Doppler frequency is affected by an ambiguity in accordance with the predetermined interval according to equation (1), since the Doppler frequency is not unambiguously sampled because of the relatively long time intervals Tr2r. In addition to the v-d line that results in accordance with the frequency bin k, periodic values of the relative velocity v which were determined from the frequency bin l are depicted by dashed lines. The intersection points with the v-d line are marked. They correspond to possible value pairs (v, d) of the relative velocity and distance of radar target 18. The actual target whose velocity v is to be determined is marked by an X.

The ambiguity of the ascertained velocity v is now resolved in the manner explained below. The information item v* regarding the relevant periodic values of the relative velocity v is conveyed to a second functional block 58 that furthermore receives the complex two-dimensional spectra $X_i(n,m)$ of the partial measurements.

In order to evaluate the measured phase difference, a control vector a(v) of an ideal measurement is calculated as a function of the relative velocity v in accordance with equation (3), which is written here, for l=2 sequences, as:

$$a(v, m) = \frac{1}{\sqrt{2}} \begin{pmatrix} 1 \\ e^{2\pi j \frac{2}{c} f_0 T_{12,m} v} \end{pmatrix}.$$

The measurement vector $a_{k,l}(n,m)$ is defined correspondingly; instead of the expected velocity-dependent complex values, the complex amplitudes (spectral values) at the position k,l of the peak of the calculated two-dimensional spectra of the partial measurements are used as components of the vector, as indicated in equation (4); a normalization is accomplished in the definition below of the likelihood function.

Based on the measurement vectors and the control vectors, a normalized likelihood function in the form of a relative velocity spectrum S(v) is defined as:

$$S(v) = \frac{1}{\sum_{m=1}^{M}\sum_{n=1}^{N} |a_{k,l}^H(n,m)|^2} \sum_{m=1}^{M} \sum_{n=1}^{N} |a_{k,l}^H(n,m) a(v,m)|^2,$$

where $a^H_{k,l}(n,m)$ designates the Hermitian-adjoint vector to the measurement vector $a_{k,l}(n,m)$, i.e., a column vector in which the individual components are complexly conjugated with the components of the vector $a_{k,l}(n,m)$. The likelihood function thus corresponds to a normalized sum of the absolute value squares of the (complex) scalar products between the measurement vector and the control vector of the transfer channels, the summation being performed over the different transfer channels, each transfer channel referring to a combination of reception channel n and transmission switching state m.

The relative velocity spectrum S(v) corresponds generally to a superimposition of periodic functions of the relative velocity v. The maxima of the likelihood function correspond to the most probable values of the parameter v. Considered in isolation, the relative velocity spectrum S(v)

is ambiguous. A maximum corresponds respectively to an, on average, optimum agreement between the ideal phase shifts resulting for the relevant value of v and the measured phase shifts in accordance with the measurement vectors. An evaluation of the function S(v) is only necessary, however, at the points that correspond to those periodic values of the relative velocity v which were obtained from the evaluations according to the position of the peak in the bins (k,l). As an example, let it be assumed that a maximum agreement is obtained at the actual relative velocity v=0 m/s, where the function S(v) assumes the expected maximum value of 1.

The ambiguity that results from the position of the peak can thus be resolved by way of the additional information from the phase relationship. An estimated value for the distance d, pertinent to the selected estimated value for the relative velocity v, is determined based on the linear correlation.

Functional block 58 outputs the ascertained estimated values for the relative velocity v and the distance d, as well as the complex amplitudes X of the peaks, to an angle estimator 60. For example, the estimated relative velocity v can be used to compensate for the phase shifts, caused by the relative velocity v, of the spectral values of the individual sequences with respect to a reference sequence. In addition to or instead of the spectra X of the baseband signals, the baseband signals b can also be outputted directly to angle estimator 60, or spectra calculated separately from the baseband signals b can be outputted to the angle estimator.

The time signals (baseband signals) corresponding to the different sequences of ramps are therefore firstly processed separately. Detection of a radar target 18 then takes place in the power spectrum 56 recovered by non-coherent integration. The ambiguity of the velocity v is then resolved based on the detection and on the complex amplitudes at the position of the peak.

The non-coherent merger of the spectra to yield the power spectrum 56 is preferably carried out, as described, in common for all reception channels and all transmitting antenna elements. This improves peak detection.

Figure 5:
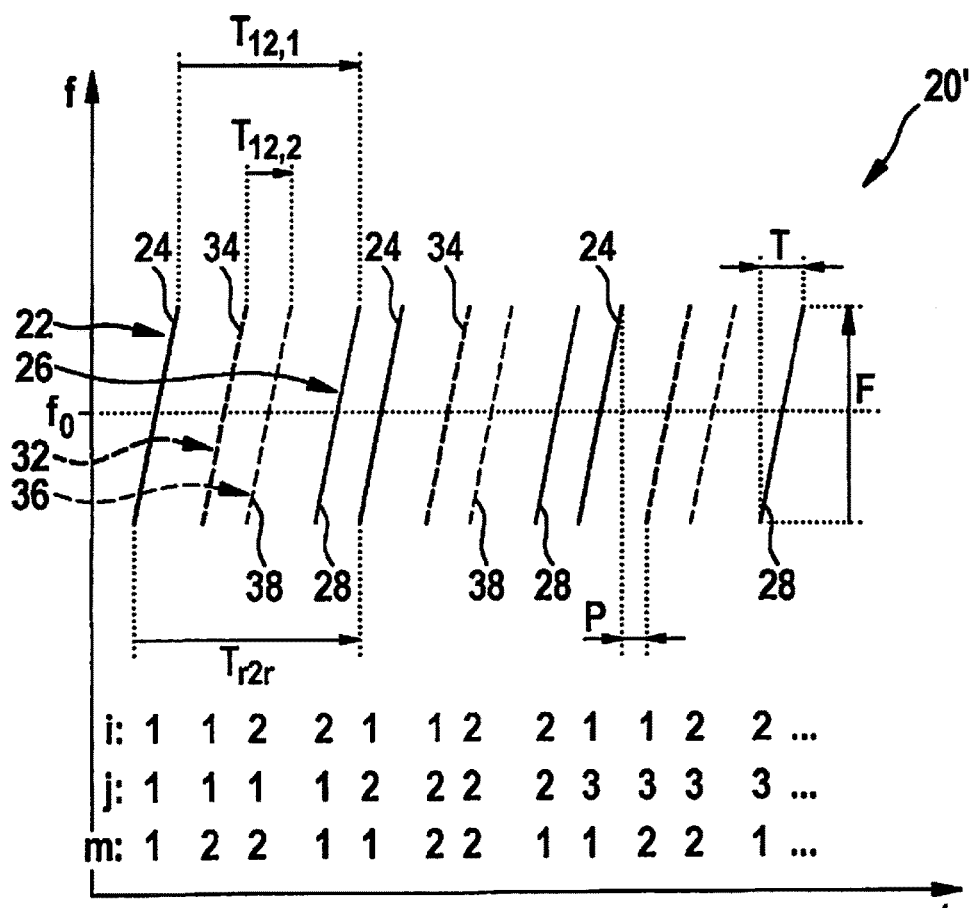
FIG. 5 shows a further example of a modulation pattern.

FIG. 5 schematically shows a further example of a transmitted signal 20' in which, as compared with the example of FIG. 2, the sequences are interleaved in a mixed sequence. Disposed between two ramps 24, 28 having the same ramp index j of two sequences 22, 26 of the transmission switching state m=1 is at least one ramp (here two ramps 34, 38) having the same ramp index j of a different transmission switching state m=2. Evaluation is accomplished as described above. It is thereby possible to at least partly mutually compensate for the effects, on the phase correction of the signals obtained for the individual sequences of a transmission switching state m, of any estimating error Δv that occurs in the determination of the estimated value v for the relative velocity.

The method described with reference to the examples can be modified by the fact that for at least one transmission switching state, a first sequence i=1 of ramps, and at least two further sequences i=2, i=3 of ramps, are transmitted in temporally interleaved fashion. The further sequences of ramps have a different time offset with respect to the first sequence. For example, a time offset T13,m between a ramp of the third sequence and the corresponding ramp of the first sequence is different from the time offset T12,m. The result is that the ambiguities can be even better suppressed, so that a larger temporal spacing Tr2r is made possible.

In individual cases it can happen that two radar targets having different distances and different velocities have the same peak position (k,l) in the spectrum 56. The measured phase relationships then cannot be associated with a single relative velocity of a radar target. Evaluation device 16 can be configured to detect this type of measurement interference based on a deviation, exceeding a threshold value, of the maximum agreement, i.e., the maximum value of the relevant values of the relative velocity spectrum S(v), from the expected maximum value of 1. Evaluation device 16 can then output an interference signal. A temporarily occurring multiple occupancy of a peak in the spectrum 56 can also be recognized, however, from the fact that in the context of a tracking of detected objects carried out on the basis of the estimated values of v and d of a radar target 18, evaluation device 16 recognizes an incorrect detection over several measurement cycles.

Different modulation parameters of the ramps, for example different center frequencies, ramp slopes, temporal spacings Tr2r, and/or time offsets T12,m, are preferably used for several successively performed radar measurements. Random multiple occupancies of peak positions can thereby be limited to individual cases.

Instead of a non-coherent merger of the individual spectra to yield the power spectrum 56, it is also conceivable to group reception channels n together into one reception channel by digital beam forming. For example, for the respective transmission switching state m, respective weighting factors are added coherently, i.e., in consideration of the phase, to the spectra or measurement vectors of N reception channels. The summations over n are then accordingly omitted from the equations for S(v).

What is claimed is:

1. A method for localizing a radar target with an angularly resolving MIMO FMCW radar sensor, the method comprising:

transmitting, by the radar sensor, a frequency modulated signal in ramp-shaped fashion, the frequency modulated signal exhibiting a modulation pattern that encompasses several sequences of ramps, ramps of the sequences following one another within the respective sequence in time-offset fashion at a time interval, at least two of the sequences being associated with different transmission switching states, the different transmission switching states differing from one another in terms of a selection of antenna elements of the radar sensor used for transmission, the at least two of the sequences being temporally interleaved with one another, a switchover between different ones of the transmission switching states occurring between successive ramps that are associated with the different ones of the transmission switching states, at least one of the transmission switching states respectively having associated with it at least two of the sequences that are temporally interleaved with one another and exhibit with respect to one another, with reference to a first sequence of the at least two sequences, a time offset associated with a respective further sequence of the at least two sequences;

mixing down received signals with the transmitted frequency modulated signal to form baseband signals;

from the baseband signals, at least for the at least one transmission switching state with which the at least two sequences are associated, calculating a two-dimensional spectrum separately for each of the at least two sequences by two-dimensional Fourier transformation, transformation occurring in a first dimension ramp for ramp and transformation occurring in a second dimension over a ramp index that counts the ramps within the sequence;

based on a position of a peak in at least one of the two-dimensional spectra of the baseband signals, determining values for a relative velocity of a radar target which are periodic with a predetermined velocity period;

checking phase relationships of spectral values that are obtained respectively at the same position and respectively for the same transmission switching state in the separately calculated two-dimensional spectra for agreement with phase relationships expected for several of the periodic values of the relative velocity in the context of the respective transmission switching state; and based on the result of the checking, selecting an estimated value for the relative velocity of the radar target from the determined periodic values of the relative velocity.

2. The method as recited in claim 1, wherein at least two of the transmission switching states each have associated with them at least two of the sequences, which are temporally interleaved with one another and exhibit with respect to one another, with reference to a first sequence of the respective transmission switching state, a time offset associated with a respective further sequence of the transmission switching state, different time offsets of the further sequences being used in the context of the different transmission switching states.

3. The method as recited in claim 1, wherein successive ramps within a respective sequence have an identical ramp slope and an identical difference in their ramp center frequencies, difference in the ramp center frequencies being not equal to zero, and ramps that have the same ramp index in the respective sequences exhibiting the same ramp slope and the same ramp center frequency.

4. The method as recited in claim 1, wherein the ramps of the sequences have the same frequency swing.

5. The method as recited in claim 1, wherein, at least for the at least one transmission switching state with which the at least two sequences are associated, the two-dimensional spectrums calculated separately for each of the sequences are merged into one two-dimensional spectrum of the baseband signals which is used in step (c) of determining values for the relative velocity.

6. The method as recited in claim 1, wherein a relationship in accordance with the equation $$\Delta\varphi_{12,m} = 2\pi \frac{2}{c} f_0 T_{12,m} v$$

is used in the context of checking the phase relationship, which equation correlates an expected phase difference $\Delta\phi_{12}$,m between a phase of the spectral value of the respective spectrum of a further sequence and a phase of the spectral value of the spectrum of the first sequence with the time offset T12,m associated with the further sequence of the transmission switching state m and with the relative velocity v, where c is the speed of light and $f_0$ is an average transmission frequency.

7. The method as recited in claim 1, wherein, in the context of checking the phase relationship for agreement with expected phase relationships, a square of an absolute value of a complex scalar product $a^H_{k,l}(n,m)a(v,m)$ of a measurement vector $a_{k,l}(n,m)$ having a control vector $a(v,m)$ dependent on the value v of the relative velocity being calculated; m denoting a transmission switching state and n denoting a reception channel that is used; the components of the measurement vector $a_{k,l}(n,m)$ being the spectral values of the spectra (X), calculated separately for the sequences associated with the transmission switching state m of the reception channel, at the position (k,l) of the peak; $a^H_{k,l}(n,m)$ being the Hermitian-adjoint vector to $a_{k,l}(n,m)$, and the control vector a(v,m) being a control vector of an ideal measurement for a radar target having a relative velocity v; the components of the control vector a(v,m) being, except for a common normalization factor, the respective phase difference ($\Delta\phi_{12,m}$), expected for the time offset (T12,m) associated with the respective sequence of the transmission switching state m, with respect to the first sequence; the first component of the control vector a(v,m) being, except for the common normalization factor, equal to 1.

8. The method as recited in claim 1, wherein, in the context of checking the phase relationship for agreement with expected phase relationships, a respective degree of an agreement S(v) being determined in accordance with the equation $$S(v) = \frac{1}{\sum_{(m,n)\in MN} |a^H_{k,l}(n,m)|^2} \sum_{(m,n)\in MN} |a^H_{k,l}(n,m)a(v,m)|^2,$$

MN being combinations of transmission switching states m and reception channels n that are used; $a_{k,l}(n,m)$ being a measurement vector whose components are the spectral values of the spectra (X), each calculated separately, for the baseband signals of the individual sequences of the transmission switching state m and for the individual reception channels n, at the position (k,l) of the peak; $a^H_{k,l}(n,m)$ being the Hermitian-adjoint vector to $a_{k,l}(n,m)$; and a(v,m) being a control vector of the ideal measurement with the transmission switching state m for a radar target having a relative velocity v.

9. The method as recited in claim 1, wherein, in the case of interference in the phase relationship between the aforesaid spectral values which corresponds to a situation in which two radar targets having different relative velocities occupy the same position (k,l) in the at least one two-dimensional spectrum, the existence of the interference is recognized from the fact that an expected degree of agreement between the phase relationship and the expected phase relationships is not reached.

10. The method as recited in claim 1, wherein, based on a position of the peak in the first dimension of the at least one two-dimensional spectrum, a linear correlation between the distance and the relative velocity of the radar target is determined; and based on a position of the peak in the second dimension of the at least one two-dimensional spectrum, at least those values for the relative velocity of the radar target which are periodic with the predetermined velocity period are determined.

11. A MIMO FMCW radar sensor having a control and evaluation device, the control and evaluation device designed to perform:

transmitting, by the radar sensor, a frequency modulated signal in ramp-shaped fashion, the frequency modulated signal exhibiting a modulation pattern that encompasses several sequences of ramps, ramps of the sequences following one another within the respective sequence in time-offset fashion at a time interval, at least two of the sequences being associated with different transmission switching states, the different transmission switching states differing from one another in terms of a selection of antenna elements of the radar sensor used for transmission, the at least two of the sequences being temporally interleaved with one another, a switchover between different ones of the transmission switching states occurring between successive ramps that are associated with the different ones of the transmission switching states, at least one of the transmission switching states respectively having associated with it at least two of the sequences that are temporally interleaved with one another and exhibit with respect to one another, with reference to a first sequence of the at least two sequences, a time offset associated with a respective further sequence of the at least two sequences;

mixing down received signals with the transmitted frequency modulated signal to form baseband signals;

from the baseband signals, at least for the at least one transmission switching state with which the at least two sequences are associated, calculating a two-dimensional spectrum separately for each of the at least two sequences by two-dimensional Fourier transformation, transformation occurring in a first dimension ramp for ramp and transformation occurring in a second dimension over a ramp index that counts the ramps within the sequence;

based on a position of a peak in at least one of the two-dimensional spectrums of the baseband signals, determining values for a relative velocity of a radar target which are periodic with a predetermined velocity period;

checking phase relationships of spectral values that are obtained respectively at the same position and respectively for the same transmission switching state in the separately calculated two-dimensional spectrums for agreement with phase relationships expected for several of the periodic values of the relative velocity in the context of the respective transmission switching state; and based on the result of the checking, selecting an estimated value for the relative velocity of the radar target from the determined periodic values of the relative velocity.

* * * * *